United States Patent
Park et al.

(10) Patent No.: US 9,210,567 B2
(45) Date of Patent: Dec. 8, 2015

(54) METHOD FOR TRANSMITTING AND RECEIVING PARAMETER UPDATE INFORMATION IN A WIRELESS COMMUNICATION SYSTEM, AND DEVICE USING SAME

(75) Inventors: Giwon Park, Anyang-si (KR); Youngsoo Yuk, Anyang-si (KR)

(73) Assignee: LG Electronics Inc., Seoul (KR)

( * ) Notice: Subject to any disclaimer, the term of this patent is extended or adjusted under 35 U.S.C. 154(b) by 69 days.

(21) Appl. No.: 13/982,367

(22) PCT Filed: Feb. 14, 2012

(86) PCT No.: PCT/KR2012/001090
§ 371 (c)(1),
(2), (4) Date: Jul. 29, 2013

(87) PCT Pub. No.: WO2012/111952
PCT Pub. Date: Aug. 23, 2012

(65) Prior Publication Data
US 2013/0310016 A1    Nov. 21, 2013

Related U.S. Application Data

(60) Provisional application No. 61/442,303, filed on Feb. 14, 2011, provisional application No. 61/466,476, filed on Mar. 23, 2011, provisional application No. 61/481,248, filed on May 2, 2011.

(51) Int. Cl.
*H04W 8/22* (2009.01)
*H04W 28/18* (2009.01)
(Continued)

(52) U.S. Cl.
CPC ............... *H04W 8/22* (2013.01); *H04W 4/001* (2013.01); *H04W 4/005* (2013.01); *H04W 4/08* (2013.01); *H04W 28/18* (2013.01); *H04W 64/00* (2013.01); *H04W 92/18* (2013.01)

(58) Field of Classification Search
None
See application file for complete search history.

(56) References Cited

U.S. PATENT DOCUMENTS

| 8,532,671 | B2 * | 9/2013 | Park et al. ................ 455/456.1 |
| 2009/0227265 | A1 * | 9/2009 | Kang et al. .............. 455/456.1 |

(Continued)

FOREIGN PATENT DOCUMENTS

| CN | 101164349 A | 4/2008 |
| CN | 102318418 A | 1/2012 |

(Continued)

*Primary Examiner* — Charles Appiah
*Assistant Examiner* — Margaret G Mastrodonato
(74) *Attorney, Agent, or Firm* — Dentons US LLP

(57) ABSTRACT

A machine to Machine (M2M) device for receiving parameter update information in a wireless communication system according to the present invention includes a receiver for receiving a first message, which includes information regarding the parameter update, from a base station. The information regarding the parameter update may include information indicating that a position update of M2M devices in a specific M2M group to which the M2M device belongs is required. The receiver may be further configured to transmit a second message including a position update request to the base station and receive a third message including position updated information on the M2M devices in the specific M2M group from the base station in response to the second message. The M2M device may further include a processor for performing a position update on the basis of the updated position information in the third message.

7 Claims, 8 Drawing Sheets

(51) Int. Cl.
*H04W 4/00* (2009.01)
*H04W 4/08* (2009.01)
*H04W 64/00* (2009.01)
*H04W 92/18* (2009.01)

(56) References Cited

U.S. PATENT DOCUMENTS

2012/0214520 A1* 8/2012 Bergqvist et al. ............. 455/458

2013/0150051 A1* 6/2013 Van Phan et al. ............. 455/437

FOREIGN PATENT DOCUMENTS

| KR | 1020050012283 A | 1/2005 |
| KR | 1020100083088 A | 7/2010 |
| KR | 1020110002440 A | 1/2011 |
| WO | WO 2010071312 A3 * | 8/2010 |

* cited by examiner

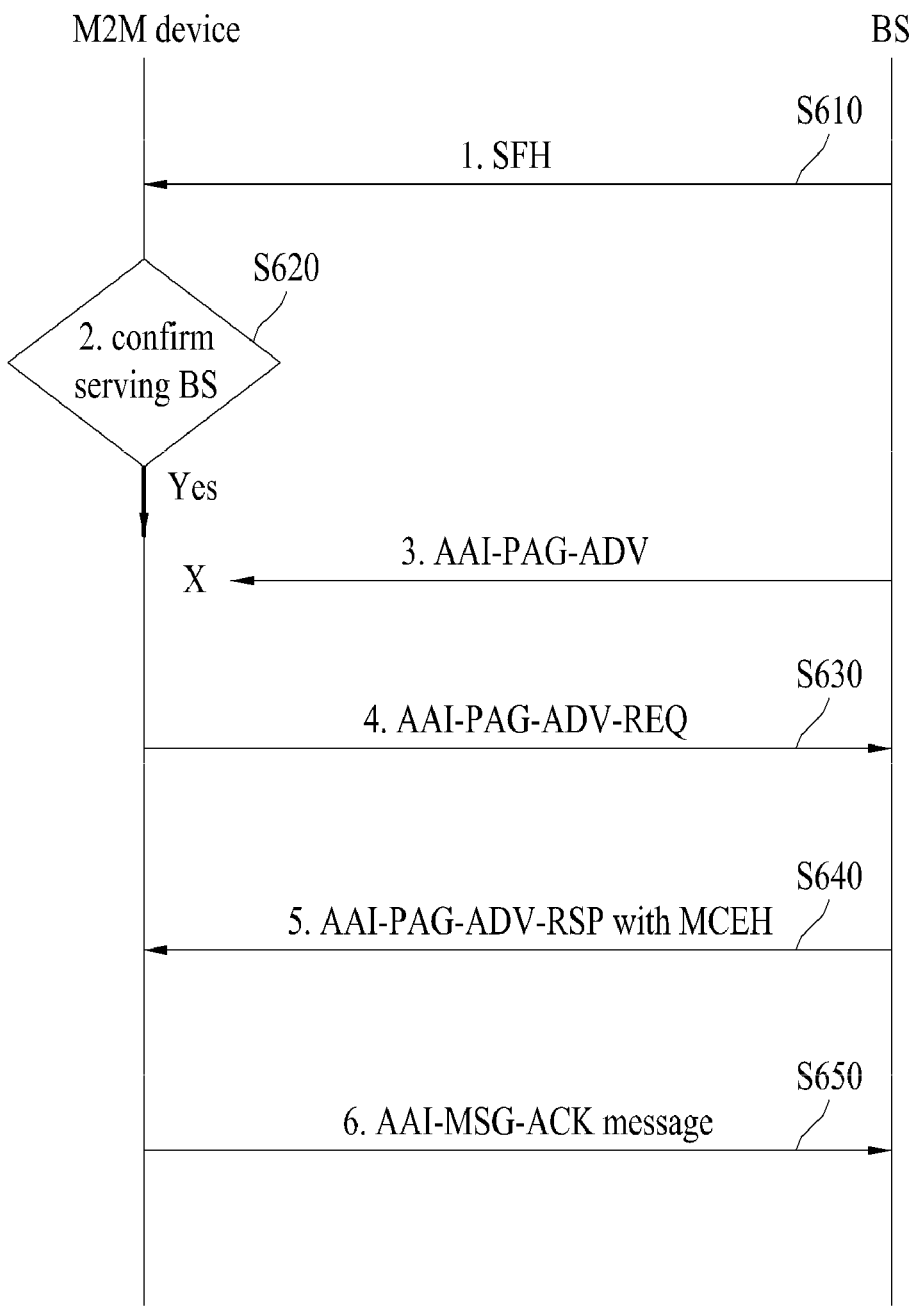

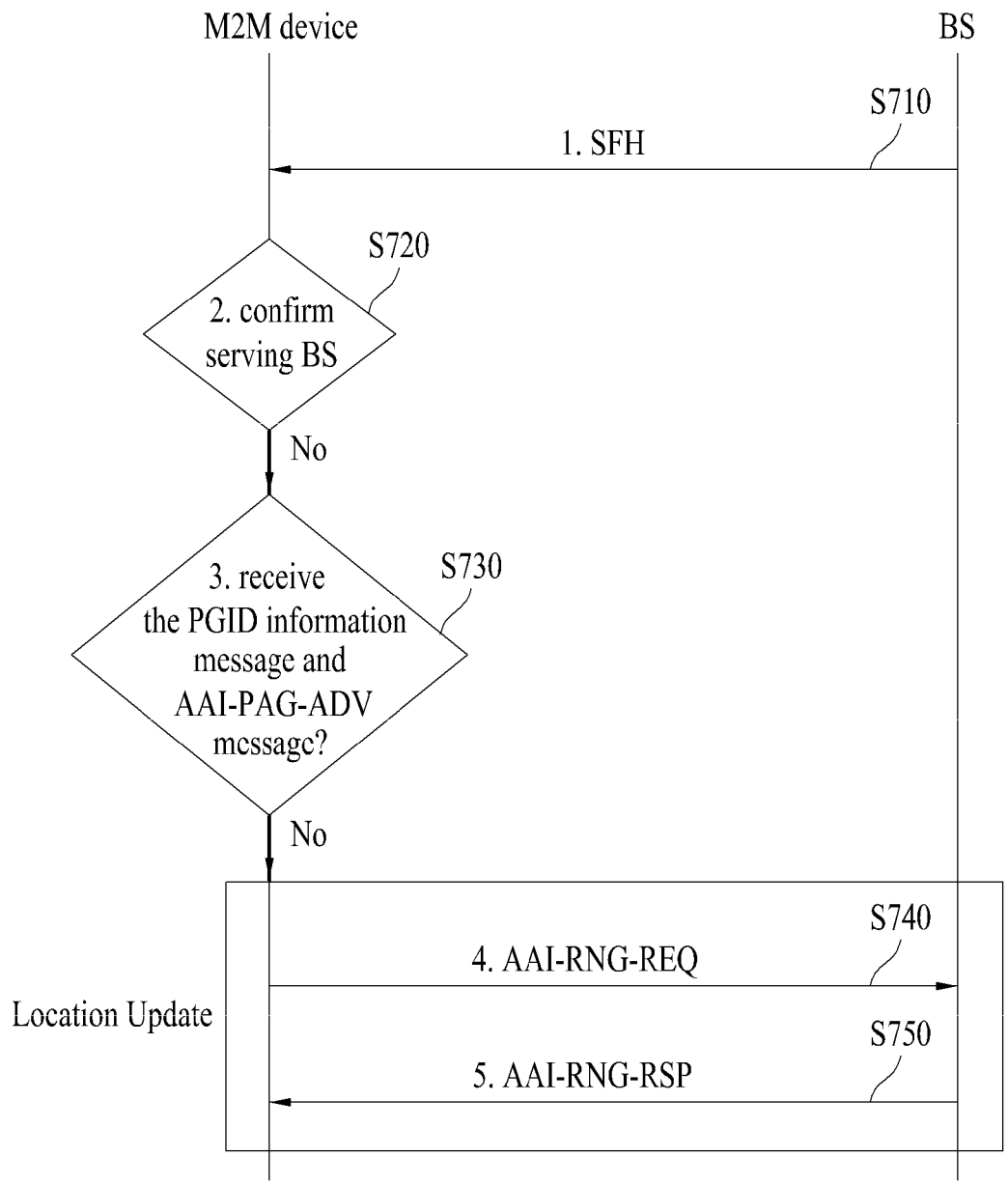

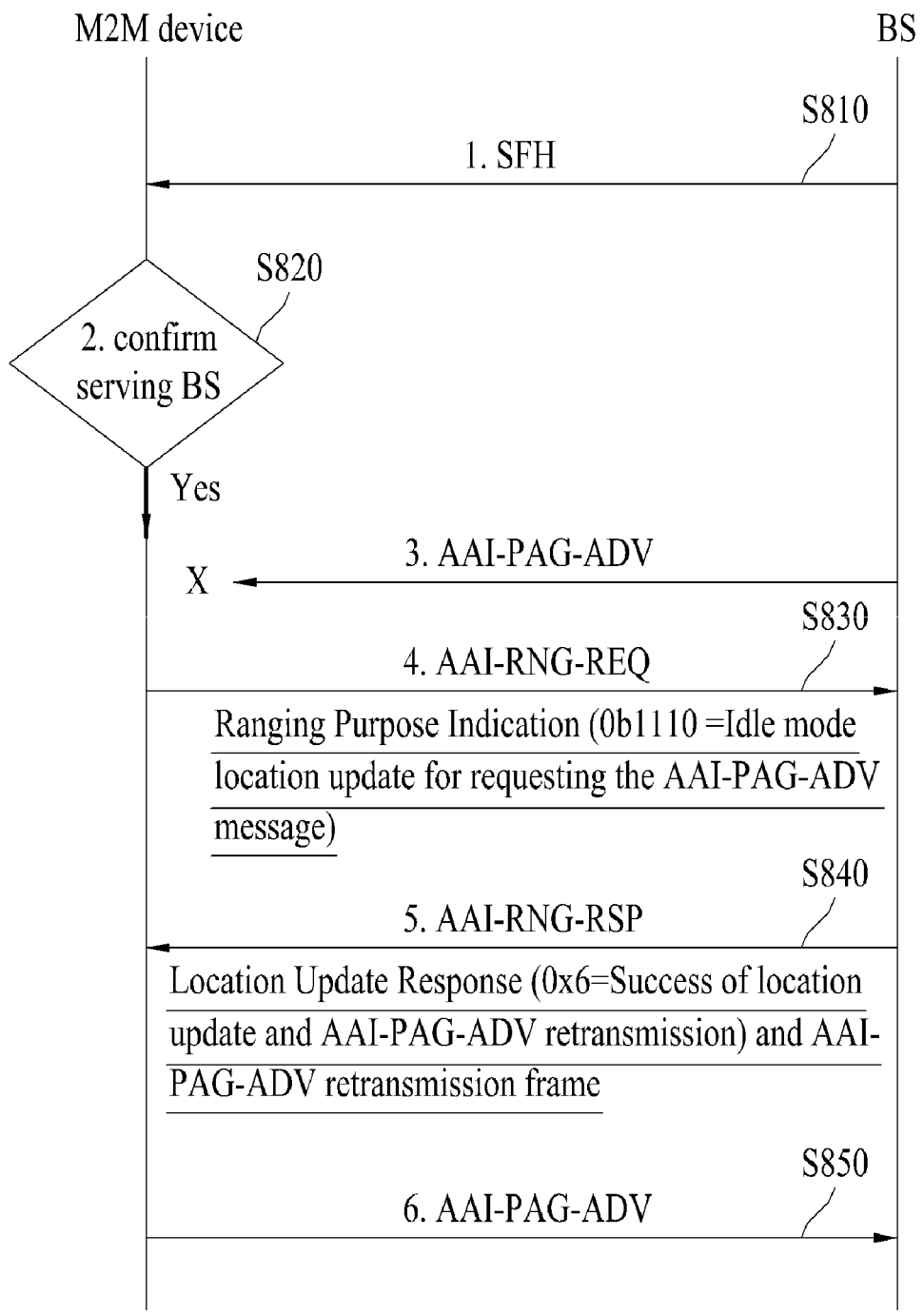

METHOD FOR TRANSMITTING AND RECEIVING PARAMETER UPDATE INFORMATION IN A WIRELESS COMMUNICATION SYSTEM, AND DEVICE USING SAME

This application is a 35 USC §371 National Stage entry of International Application No. PCT/KR2012/001090 filed on Feb. 14, 2012, and claims priority to U.S. Provisional Application Nos. 61/442,303 filed on Feb. 14, 2011; 61/466,476, filed Mar. 23, 2011 and 61/481,248, filed May 2, 2011, all of which are incorporated by reference in their entirety herein.

TECHNICAL FIELD

The present invention relates to wireless communication and, more particularly, to a method and device for transmitting and receiving parameter update information.

BACKGROUND ART

Machine-to-Machine (M2M) means communication between electronic apparatuses. In a broad sense, M2M means wired or wireless communication between electronic apparatuses or communication between an apparatus and a machine controlled by a person. However, recently, M2M generally means wireless communication between electronic apparatuses performed without human intervention.

In the early 1990's, the concept of M2M communication was only recognized as the concept of remote control or telematics and a market therefor was restricted. In the past few years, M2M communication has been rapidly grown to a market globally attracting considerable attention. In particular, M2M communication applies leverage to fields such as fleet management in point of sale (POS) and security application markets, remote monitoring of machines and equipment, and smart meters for measuring operation times of construction equipment and automatically measuring heat or electricity consumption. In the future, M2M communication will be variously used in association with existing mobile communication and wireless high-speed Internet or low-power communication solutions such as WiFi and ZigBee and will be expanded to a Business-to-Consumer (B2C) market as well as a Business-to-Business (B2B) market.

In the M2M communication age, all machines including a subscriber identity module (SIM) card may perform remote management and control through data transmission and reception. For example, M2M communication technology is widely applicable to many apparatuses and equipment such as cars, trucks, trains, containers, vending machines or gas tanks.

Conventionally, mobile stations (MSs) were generally managed in individual units and communication between a base station and an MS was performed in one-to-one correspondence. If it is assumed that numerous M2M devices communicate with the BS in one-to-one correspondence, network overload is caused due to signaling between the M2M devices and the BS. As described above, if M2M communication rapidly comes into widespread use, overhead may occur due to communication between M2M devices or between M2M devices and a BS.

In addition, in a wireless communication system supporting communication between M2M devices, a method of efficiently providing parameters when parameters (or control parameters) related to M2M devices or M2M devices of an M2M group are changed has yet to be proposed.

DISCLOSURE

Technical Problem

An object of the present invention devised to solve the problem lies in a method of transmitting parameter update information at a base station (BS) in a wireless communication system.

Another object of the present invention devised to solve the problem lies in a method of receiving parameter update information at a machine-to-machine (M2M) device in a wireless communication system.

Another object of the present invention devised to solve the problem lies in a base station (BS) device for transmitting parameter update information in a wireless communication system.

Another object of the present invention devised to solve the problem lies in an M2M device for receiving parameter update information in a wireless communication system.

The technical problems solved by the present invention are not limited to the above technical problems and those skilled in the art may understand other technical problems from the following description.

Technical Solution

The object of the present invention can be achieved by providing a method of transmitting parameter update information at a base station in a wireless communication system including transmitting a paging message including information related to a parameter update information of at least one machine-to-machine (M2M) device to the at least one M2M device, wherein the information related to the parameter update includes information indicating that a group parameter of the specific M2M group to be paged is updated. The group parameter indicated to be updated may include an M2M group identifier (ID) of a specific M2M group, and the paging message may further include an updated M2M group ID. The paging message may be an M2M group paging message or an M2M individual paging message. The parameter may be an idle-mode parameter.

In another aspect of the present invention, provided herein is a method of transmitting parameter update information at a base station in a wireless communication system including transmitting a first message including information related to an idle-mode parameter update of at least one machine-to-machine (M2M) device to the at least one M2M device, wherein the information related to the idle-mode parameter update includes information indicating that location update of M2M devices of a specific M2M group is performed. The method may further include receiving a second message including a location update request from the at least one M2M device, and transmitting a third message including location update information of M2M devices of the specific M2M group to the at least one M2M device in response to the second message.

In another aspect of the present invention, provided herein is a method of receiving parameter update information at a machine-to-machine (M2M) device in a wireless communication system including receiving a paging message including information related to a parameter update and an M2M group identifier from a base station, wherein the information related to the parameter update includes information indicating that a group parameter of a specific M2M group to be paged is updated. The group parameter indicated to be updated may include an M2M group identifier (ID) of the specific M2M group, and the paging message may further include an updated M2M group ID. The method may further include updating the M2M group ID of the M2M device to the updated M2M group ID if the M2M group ID included in the paging message corresponds to the M2M device. The paging message may be an M2M group paging message or an M2M individual paging message. The M2M group identifier may include an M2M group paging identifier.

In another aspect of the present invention, provided herein is a method of receiving parameter update information at a machine-to-machine (M2M) device in a wireless communication system including receiving a first message including information related to a parameter update from a base station, wherein the information related to the parameter update includes information indicating that location update of M2M devices of a specific M2M group to which the M2M device belongs is performed. The method may further include transmitting a second message including a location update request to the base station, and receiving a third message including location update information of M2M devices of the specific M2M group from the base station in response to the second message. The method may further include performing location update based on the location update information included in the third message. The first message may be a paging message, the second message may be a ranging request message and a third message may be a ranging response message.

In another aspect of the present invention, provided herein is a base station (BS) device for transmitting parameter update information in a wireless communication system including a transmitter for transmitting a paging message including information related to a parameter update of at least one machine-to-machine (M2M) device to the at least one M2M device, wherein the information related to the parameter update information includes information indicating that a group parameter of a specific M2M group to be paged is updated.

In another aspect of the present invention, provided herein is a base station (BS) device for transmitting parameter update information in a wireless communication system including a transmitter for transmitting a first message including information related to an idle-mode parameter update information of at least one machine-to-machine (M2M) device to the at least one M2M device, wherein the information related to the idle-mode parameter update includes information indicating that location update of M2M devices of a specific M2M group is performed.

In another aspect of the present invention, provided herein is a machine-to-machine (M2M) device for receiving parameter update information in a wireless communication system including a receiver for receiving a paging message including information related to a parameter update and an M2M group identifier from a base station, wherein the information related to the parameter update includes information indicating that a group parameter of a specific M2M group to be paged is updated. The group parameter indicated to be updated may include an M2M group identifier (ID) of the specific M2M group, and the paging message may further include an updated M2M group ID. The M2M device may further include a processor for updating the M2M group ID of the M2M device to the updated M2M group ID if the M2M group ID included in the paging message corresponds to the M2M device.

In another aspect of the present invention, provided herein is a machine-to-machine (M2M) device for receiving parameter update information in a wireless communication system including a receiver for receiving a first message including information related to a parameter update from a base station, wherein the information related to the parameter update includes information indicating that location update of M2M devices of a specific M2M group to which the M2M device belongs is performed. The receiver may be configured to transmit a second message including a location update request to the base station and to receive a third message including location update information of M2M devices of the specific M2M group from the base station in response to the second message. The M2M device may further include a processor for performing location update based on the location update information included in the third message. The first message may be a paging message, the second message may be a ranging request message and a third message may be a ranging response message.

Advantageous Effects

According to a method of transmitting and receiving parameter update information related to an M2M device proposed by various embodiments of the present invention, the M2M device can efficiently update parameters such as an M2M group ID, thereby improving communication performance.

The effects of the present invention are not limited to the above-described effects and other effects which are not described herein will become apparent to those skilled in the art from the following description.

DESCRIPTION OF DRAWINGS

The accompanying drawings, which are included to provide a better understanding of the invention, illustrate embodiments of the invention and together with the description serve to explain the principle of the invention.

FIG. 6 is a diagram showing a process of requesting retransmission of a paging message if an M2M device does not receive a paging message.

FIG. 7 is a diagram showing an embodiment of confirming that an M2M device moves to another BS via a superframe header in a paging listening interval thereof and, at the same time, performing location update if a PGID information message and a paging message are not received.

FIG. 8 is a diagram showing an embodiment of a method of requesting retransmission of an AAI-PAG-ADV message through location update.

BEST MODE

Figure 1:
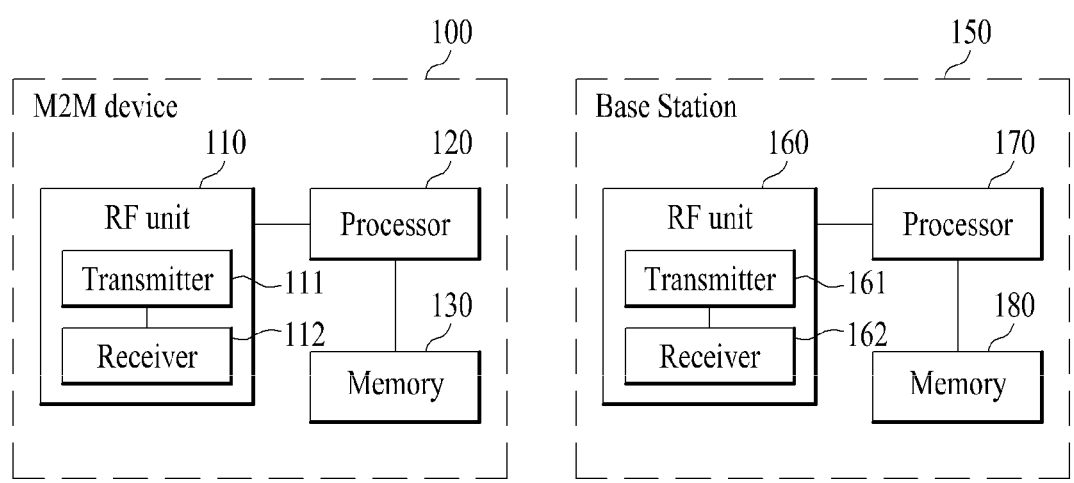
FIG. 1 is a schematic diagram showing the configuration of an M2M device and a base station (BS) according to an embodiment of the present invention.

Reference will now be made in detail to the preferred embodiments of the present invention, examples of which are illustrated in the accompanying drawings. The detailed description set forth below in connection with the appended drawings is intended as a description of exemplary embodiments and is not intended to represent the only embodiments in which the concepts explained in these embodiments can be practiced. The detailed description includes details for the purpose of providing an understanding of the present invention. However, it will be apparent to those skilled in the art that these teachings may be implemented and practiced without these specific details.

In some instances, well-known structures and devices are omitted in order to avoid obscuring the concepts of the present invention and the important functions of the structures and devices are shown in block diagram form. The same reference numbers will be used throughout the drawings to refer to the same or like parts. Specific terms used in the following description are provided for better understanding of the present invention, and the use of these specific terms may be changed to another format within the technical scope or spirit of the present invention.

For example, in the following description, the following description will be made on the assumption that a mobile communication (or wireless communication) system is an IEEE 802.16 system, but the present invention is applicable to other mobile communication systems, such as a 3GPP LTE or LTE-A system, excluding the unique matters of the IEEE 802.16 system. In the following description, it is assumed that a terminal includes a mobile or fixed user end device such as a user equipment (UE), a mobile station (MS), and an advanced mobile station (AMS) and a base station includes a node of a network end communicating with a terminal, such as a Node-B, an eNode B, a base station and an access point (AP).

In a mobile communication system, a terminal (user equipment; UE) may receive information from a base station in downlink and may transmit information in uplink. Information transmitted or received by the UE includes data and a variety of control information and a physical channel may be variously changed according to the kind and usage of information transmitted or received by the UE.

The following embodiments of the present invention can be applied to a variety of radio access technologies, for example, CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and the like. CDMA may be embodied with wireless (or radio) technology such as UTRA (Universal Terrestrial Radio Access) or CDMA2000. TDMA may be embodied with wireless (or radio) technology such as GSM (Global System for Mobile communications)/GPRS (General Packet Radio Service)/EDGE (Enhanced Data Rates for GSM Evolution). OFDMA may be embodied with wireless (or radio) technology such as Institute of Electrical and Electronics Engineers (IEEE) 802.11 (Wi-Fi), IEEE 802.16 (WiMAX), IEEE 802-20, and E-UTRA (Evolved UTRA). UTRA is a part of the UMTS (Universal Mobile Telecommunications System). 3GPP (3rd Generation Partnership Project) LTE (long term evolution) is a part of the E-UMTS (Evolved UMTS), which uses E-UTRA. 3GPP LTE employs the OFDMA in downlink and employs the SC-FDMA in uplink. The LTE—Advanced (LTE-A) is an evolved version of the 3GPP LTE.

Hereinafter, communication between M2M devices means communication performed between MSs through a BS or between a BS and MSs without human intervention. Accordingly, the M2M device means a terminal supporting communication between M2M devices. An access network for an M2M service is defined as an M2M access service network (ASN) and a network entity communicating with the M2M devices is referred to as an M2M server. The M2M server executes an M2M application and provides an M2M-specific service to one or more M2M devices. An M2M feature is a feature of an M2M application. One or more features may be necessary to provide an application. An M2M device group means a group of M2M devices sharing one or more features.

The number of devices for performing communication using an M2M scheme (referred to as an M2M device, an M2M communication device, a machine type communication (MTC) device, etc.) will be gradually increased as the number of machine application types has increased. Examples of the machine application type which is being discussed include, but are not limited to, (1) security, (2) public safety, (3) tracking and tracing, (4) payment, (5) healthcare, (6) remote maintenance and control, (7) metering, (8) consumer device, (9) fleet management in point of sale (POS) and security application markets, (10) inter-device communication in a vending machine, (11) smart meters for measuring operation times of construction equipment or automatically measuring heat and electricity consumption, (12) surveillance video communication of a surveillance camera, etc. Various other machine application types are also being discussed.

Hereinafter, the case in which M2M communication is applied to a wireless communication system (e.g., IEEE 802.16e/m) will be described as the embodiment of the present invention. However, the present invention is not limited thereto and the embodiment of the present invention is applicable to other systems such as a 3GPP LTE system.

FIG. 1 is a schematic diagram showing the configuration of an M2M device and a base station (BS) according to an embodiment of the present invention.

In FIG. 1, the M2M device 100 (also referred to as an M2M communication device) and the BS 150 may include RF units 110 and 160, processors 120 and 170, and optionally memories 130 and 180, respectively. The RF units 110 and 160 may include transmitters 111 and 161 and receivers 112 and 162, respectively. For example, the transmitter 111 and the receiver 112 of the M2M device 100 are configured to transmit and receive a signal to and from the BS 150 and other M2M devices. The processor 120 is functionally connected to the transmitter 111 and the receiver 112 and is configured to control a process of, at the transmitter 111 and the receiver 112, transmitting and receiving a signal to and from other devices. The processor 120 processes and transmits a signal to be transmitted to the transmitter 111 and processes a signal received by the receiver 112. If necessary, the processor 120 may store information included in an exchanged message in the memory 130. The M2M device 100 may perform the methods of the following various embodiments using the above-described structure. Although not shown in FIG. 1, the M2M device 100 may further include various units according to machine application type. If the M2M device 100 is an intelligent meter, the M2M device 100 may further include a power measurement unit. Such a power measurement unit may be controlled by the processor 120 shown in FIG. 1 or a separate processor (not shown).

Although FIG. 1 shows, for example, the case in which communication between the M2M device 100 and the BS 150 is performed, the M2M communication method according to the present invention may be performed between M2M devices and the devices may perform methods according to the below-described embodiments using the same configuration as the device shown in FIG. 1.

The transmitter 161 and the receiver 162 of the BS 150 are configured to transmit and receive a signal to and from another BS, an M2M server or M2M devices. The processor 170 is functionally connected to the transmitter 161 and the receiver 162 and is configured to control a process of, at the transmitter 161 and the receiver 162, transmitting and receiving a signal to and from other devices. The processor 170 processes and transmits a signal to be transmitted to the transmitter 161 and processes a signal received by the receiver 162. If necessary, the processor 170 may store information included in an exchanged message in the memory 130. The BS 150 may perform the methods of the following various embodiments using the above-described structure.

The processors 120 and 170 of the M2M device 110 and the BS 150 instruct (for example, control, adjust, or manage) the operations of the M2M device 110 and the BS 150, respectively. The processors 120 and 170 may be connected to the memories 130 and 180 for storing program codes and data, respectively. The memories 130 and 180 are respectively connected to the processors 120 and 170 so as to store operating systems, applications and general files.

The processors 120 and 170 may be called controllers, microcontrollers, microprocessors, microcomputers, etc. The processors 120 and 170 may be implemented by hardware, firmware, software, or a combination thereof. If the embodiments of the present invention are implemented by hardware, Application Specific Integrated Circuits (ASICs), Digital Signal Processors (DSPs), Digital Signal Processing Devices (DSPDs), Programmable Logic Devices (PLDs), Field Programmable Gate Arrays (FPGAs), etc. may be included in the processors 120 and 170.

If the embodiments of the present invention are implemented by firmware or software, the firmware or software may be configured to include modules, procedures, functions, etc. for performing the functions or operations of the present invention. The firmware or software configured to perform the present invention may be included in the processors 120 and 170 or may be stored in the memories 130 and 180 so as to be executed by the processors 120 and 170.

Hereinafter, an idle mode refers to a mode for managing a paging group, a paging cycle and a paging offset granted by the BS through signaling between an MS and the BS in order to save power of the MS, that is, a mechanism for periodically receiving a downlink broadcast message without registration with a specific BS even when the MS travels in a radio link environment in which a plurality of BSs is located over a wide region.

The idle mode means a state in which all normal operations as well as handover (HO) are stopped and only downlink synchronization is performed such that a paging message which is a broadcast message is received only in a predetermined interval. The paging message notifies the MS of a paging action. For example, the paging action includes ranging performance, network reentry, etc.

The idle mode may be invoked by an MS or a BS. That is, the MS may transmit a deregistration request (e.g., DREG-REQ) message to the BS and receive a deregistration response (e.g., DREG-RSP) message from the BS so as to enter an idle mode. In addition, the BS may transmit a non-request deregistration response (e.g., DREG-RSP) message or a deregistration command (e.g., DREG-CMD) message to the MS such that the MS enters an idle mode.

If the MS receives a paging message during a paging listening interval in the idle mode, the MS is switched to a connected mode through a network entry process with the BS to transmit and receive data to and from the BS.

Idle state or idle mode operation refers to operation supporting periodic downlink broadcast traffic transmission without registration with a specific BS when an MS travels in a radio link environment including multiple BSs. If the MS does not receive traffic from the BS during a predetermined time, the MS may transition to the idle state in order to save power. The MS which transitions to the idle mode may receive a broadcast message (e.g., a paging message) broadcast by the BS during the listening interval and determine whether the MS transitions to a normal mode or remains in an idle mode.

The idle state is able to give benefits to an MS by eliminating a handover-related activation requirements and general operation requirements. The idle state is able to save power and operational resources used by an MS in a manner of put limitation on an MS action to be scanned in a discrete cycle. In addition, the idle state provides a simple and proper method of informing an MS of pending downlink traffic and is able to give benefits to a network and a ES by removing wireless interface and network handover (HO) traffic from an inactive MS.

Paging refers to a function for confirming the location of the MS (e.g., to which BS or switch center the MS belongs) when an incoming call is encountered during mobile communication. A plurality of BSs supporting the idle state or the idle mode belongs to a specific paging group so as to configure a paging area. At this time, the paging group indicates a logical group. If there is traffic that targets a mobile station (MS), the purpose of the paging group is to provide a neighbor ranging area that can be paged in downlink (DL). The paging group should meet the condition to be large enough for a specific MS to exist for most of time within a same paging group and the condition to be small enough for a paging load to maintain a proper level.

The paging group may include one or more BSs. One BS may be included in one or more paging groups. The paging group is defined in a management system. A paging group is able to use a paging group-action backbone network message. Moreover, a paging controller may manage a list of MSs in idle mode using a paging-announce message corresponding to one of backbone network messages and manage initial paging of all BSs belonging to a paging group.

Paging in the idle mode is described based on an IEEE 802.16 system, for convenience of description. However, the technical scope of the present invention is not limited thereto. An MS transmits a deregistration request (DREG-REQ) message to a BS in order to enter an idle mode. Thereafter, the BS transmits a deregistration response (e.g., DREG-RSP) message to the MS in response to the DREG-REQ message. At this time, the DREG-RSP message includes paging information. Entrance of the MS to the idle mode may be initiated by a BS's request. In this case, the BS transmits the DREG-RSP message to the MS.

The paging information may include a paging cycle, a paging offset, a paging group identifier (PGID), a paging listening interval, etc.

The MS which has received the DREG-RSP message from the BS enters the idle mode by referring to the paging information. The idle mode has a paging cycle and one paging cycle may include an available interval and an unavailable interval. At this time, the available interval is equal to a paging listening interval or a paging interval. The paging offset indicates a time when a paging interval starts within a paging cycle (e.g., a frame or a subframe). In addition, the paging group identifier indicates an identifier of a paging group allocated to an MS. The paging information may include paging message offset information. The paging message offset information indicates a time when a BS transmits a paging message. Thereafter, the MS may receive a paging message in the available interval. that is, the paging listening interval, using the paging information. The paging message may be transmitted via the BS or the paging controller. That is, the MS monitors a radio channel according to the paging cycle in order to receive the paging message.

The MS in the idle mode receives a paging message in a paging listening interval thereof and determines whether there is downlink (DL) data transmitted thereto. If there is downlink data (that is, positive indication), the MS performs a network reentry process including a ranging process. Thereafter, a process of establishing a connection for a related downlink service flow is performed via a dynamic service addition (DSA) process. After the connection for the service flow has been established, the BS transmits downlink data for the service to the MS.

Hereinafter, for convenience of description, an IEEE 802.16, 16m or 16p system will be described. However, the technical range of the present invention is not limited to a specific wireless communication system.

An MS transmits a deregistration request (DREG-REQ) message to a BS in order to enter the idle mode. Thereafter, the BS transmits a deregistration response (e.g., DREG-RSP) message to the MS in response to the DREG-REQ message. At this time, the DREG-RSP message includes paging information. Entrance of the MS to the idle mode may be initiated by a BS's request. In this case, the BS transmits the DREG-RSP message to the MS.

The paging information may include a paging cycle, a paging offset, a paging group identifier (PGID), a paging listening interval, etc. The MS which has received the DREG-RSP message from the BS enters the idle mode by referring to the paging information.

The idle mode has a paging cycle and one paging cycle may include an available interval and an unavailable interval. At this time, the available interval is equal to a paging listening interval or a paging interval. The paging offset indicates a time when a paging interval starts within a paging cycle (e.g., a frame or a subframe). In addition, the paging group identifier indicates an identifier of a paging group allocated to an MS. The paging information may include paging message offset information. The paging message offset information indicates a time when a BS transmits a paging message.

Thereafter, the MS may receive a paging message in the available interval (that is, the paging listening interval) using the paging information. The paging message may be transmitted via the BS or the paging controller. That is, the MS monitors a radio channel according to the paging cycle in order to receive the paging message.

Hereinafter, a hierarchical group structure of M2M devices in an M2M communication system will be described.

In order to easily manage many M2M devices, M2M devices having the same attributes (or features or properties) are grouped and M2M devices (MSs) belonging to the same group are managed. At this time, there are criteria for grouping the MSs as follows.

Application type based grouping: MSs are grouped by application types such as electronic metering, gas metering, healthcare, etc. For example, gas metering application type devices are grouped.

M2M subscriber based grouping: For example, MSs may be grouped by M2M subscribers such as Korea Power, Samchully gas, Seoul gas, etc.

One or more subscribers may exist in one application type. For example, Samchully gas and Seoul gas may be present in a gas metering application type.

Location based grouping: M2M devices may be grouped based on location.

The M2M system creates groups based on such criteria and allocates a group ID to each group. One group may have a sub group according to circumstances and the BS may allocate group IDs and sub group IDs to the M2M devices.

Figure 2:
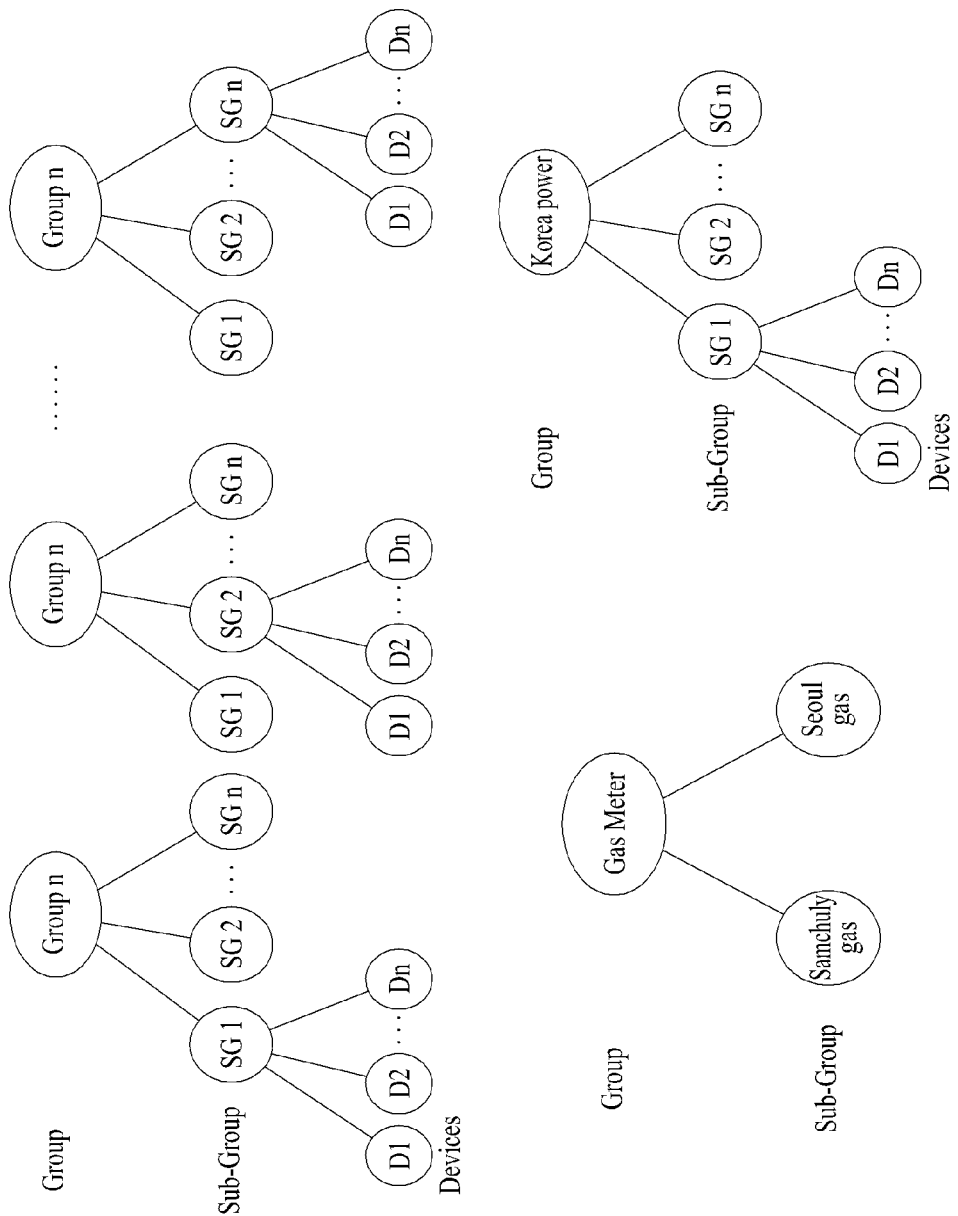
FIG. 2 is a diagram showing an example of a hierarchical M2M group structure.

FIG. 2 is a diagram showing an example of a hierarchical M2M group structure.

Referring to FIG. 2, one group includes one or more (n, n=1, ..., and n) sub groups and one group includes one or more M2M devices. A sub grouping example will now be described. As described above, when grouping is performed based on the gas metering application type, if the number of M2M devices belonging to the group is large, the M2M devices may be divided into several sub groups each having n M2M devices.

For example, if the number of M2M devices belonging to Korea Power in one cell is 10000 and one sub group includes 100 M2M devices, one group of Korea Power includes 100 sub groups. If grouping is performed based on M2M subscriber properties or application types, a cell-specific ID is not allocated but a group or network common ID of a specific cell is allocated to an M2M group. That is, such a group ID is maintained even when the cell is changed.

However, the sub group ID may be changed on a per cell basis if grouping is performed by the number of M2M devices located in a cell. If the cell is changed, the sub group ID needs to be updated. This may be summarized as follows.

Group ID: This is a network common ID and is equal in a network or a specific cell group.

Subgroup ID: This is a cell-specific ID. That is, sub group IDs mapped to a group ID may differ even when the group ID is the same on a per cell basis. If a cell is changed due to mobility, a sub group ID may be changed and, in this case, the sub group ID needs to be updated.

Figure 3:
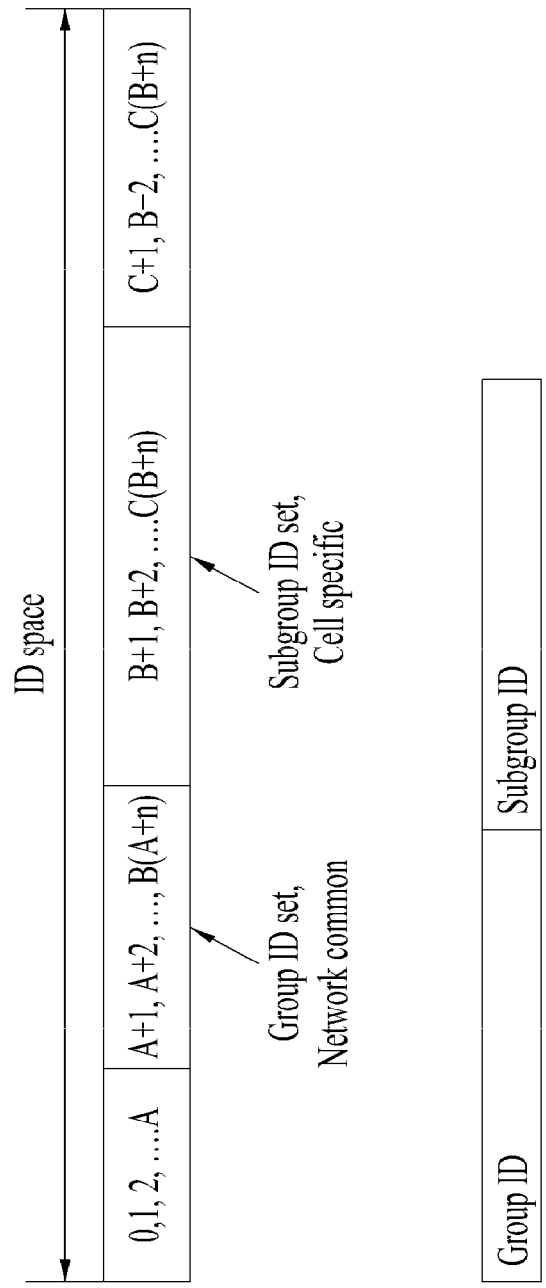
FIG. 3 is a diagram showing a method of allocating a group ID and a subgroup ID.

FIG. 3 is a diagram showing a method of allocating a group ID and a subgroup ID.

Referring to FIG. 3, 0, 1, 2, ..., and A may be used as an ID for an existing MS. A+1 to A+n(B) are a group ID set for M2M devices and are used as a network common (or cell group common) group ID. The sub group ID set is B+1 to B+n(C) and may have ranges which differ between cells.

If each group includes 10 sub groups in a BS A, IDs may be configured as shown in Table 1.

TABLE 1

| Group ID | Subgroup ID |
|---|---|
| A + 1 | B + 1, B + 2, ..., B + 10 |
| A + 2 | B + 11, B + 12, ..., B + 20 |
| A + n | B + ((10 * (n − 1)) + 1), B + ((10 * (n − 1)) + 2), B + ((10 * (n − 1)) + 10) |

The sub group IDs of each group may not be continuous. For example, sub group IDs of a group A+1 may be B+1, B+7, B+15, ....

The BS may allocate resources to an M2M device using a group ID and a sub group ID. For example, when resources are individually allocated to M2M devices in a connected mode using an individual MAP IE (used when resources are allocated only to a specific M2M device) or a group allocation MAP IE (used when resources are allocated to MSs belonging to a group or a sub group), a sub group ID is used (e.g., a sub group ID is masked with CRC such that M2M devices detect a MAP of a group to which the M2M devices belong).

However, if multicast traffic which must be transmitted to all M2M devices belonging to a specific M2M subscriber, such as software/firmware, etc., is transmitted, a group ID may be used. Such a group ID may be used (the group ID masked with CRC) even when downlink control information (e.g., A-MAP IE) for a paging message is decoded.

The above description may be summarized as follows. An ID allocated by a network is a static ID.

Subscriber ID (or multicast group ID): ID allocated by a network
  Network common
    Used in multicast traffic transmission (included in MAP for multicast traffic) (e.g., CRC masking or fields in MAP))
    Indicate a group upon group paging (masked with CRC of MAP for a paging message or included in a paging message as a group ID field (or a bitmap)
    Allocated upon initial network entry (or upon release) and maintained even in an idle mode. As another method, this may be allocated through a service generation procedure (DSA procedure) for a multicast service. At this time, after an M2M device has performed initial network entry, the BS may allocate this ID to an M2M device through a pre-provisional DSA procedure.
Device ID: Unique to a subscriber
  Included in a message or MAP to indicate an individual device.
User ID
  Used to identify an M2M device in one group in a connected mode.
  Allocated or deallocated when a group ID is allocated or deallocated.
  Group-wise unique ID
  A bitmap or an ID may be inserted into MAP.

As described above, the BS may transmit a group paging message or an individual paging message to M2M devices. For transmission, a method of including a group identifier and an individual identifier together in a paging message may be considered. M2M devices may be grouped through the above-described group and M2M devices belonging to the same group may be paged.

A frame of an Institute of Electrical and Electronics Engineers (IEEE) 802.16m system includes a plurality of subframes, and a subframe includes a plurality of subcarriers on a frequency axis and includes a plurality of OFDM symbols on a time axis. Some of a plurality of subframes included in one frame are used to transmit uplink data and the remaining subframes are used to transmit downlink data. Hereinafter, a frame structure of an IEEE 802.16m system will be briefly described.

Figure 4:
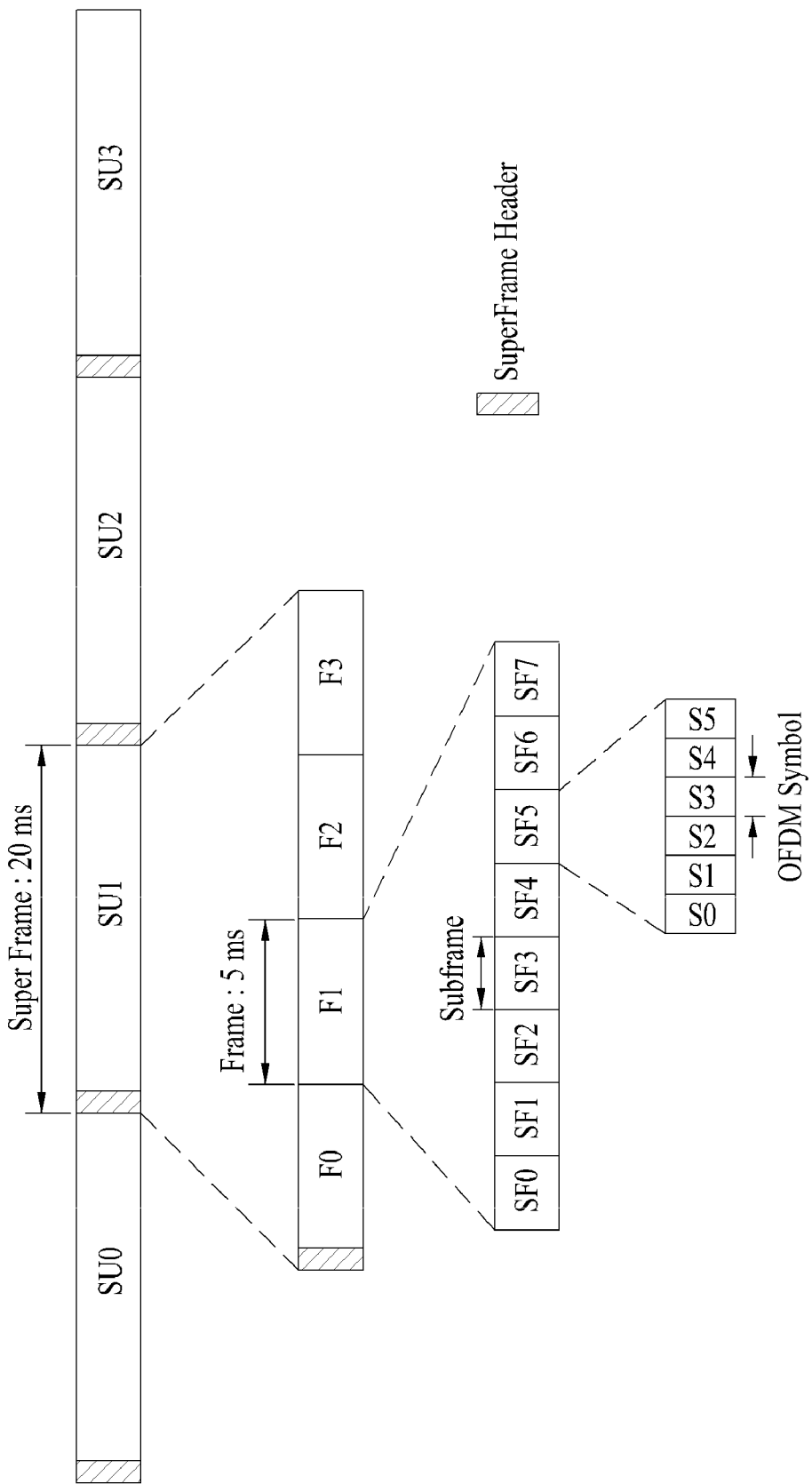
FIG. 4 is a diagram showing a basic frame structure in an IEEE 802.16m system which is an example of a mobile communication system.

FIG. 4 is a diagram showing a basic frame structure in an IEEE 802.16m system as an example of a mobile communication system.

Referring to FIG. 4, a 20-ms superframe is divided into four 5-ms frames having the same size. The 5-ms frame has a channel bandwidth of any one of 5 MHz, 10 MHz and 20 MHz and each 5-ms radio frame may include seven or eight subframes according to channel bandwidth. One subframe may be allocated for downlink or uplink transmission. One subframe may include OFDMA symbols, the number of which is changed according to channel bandwidth. A first type subframe may include six OFDMA symbols, a second type subframe may include seven OFDMA symbols and a third type subframe may include five OFDMA symbols. A BS may transmit system information, control information, etc. to an MS using a control channel in a frame structure and transmit data, etc. in a remaining frame region excluding control channel. A control channel via which a BS transmits control information to an MS may include a superframe header (SFH), an advanced-MAP (A-MAP), etc.

Among others, the SFH includes a primary superframe header (P-SCH) and a secondary superframe header (S-SFH). The SFH is a channel used to broadcast essential or supplementary system information to MSs. That is, a BS transmits an SFH to an MS to assist the MS in being powered on to initially enter a network, reentering a network or performing handover as the MS moves.

Figure 5:
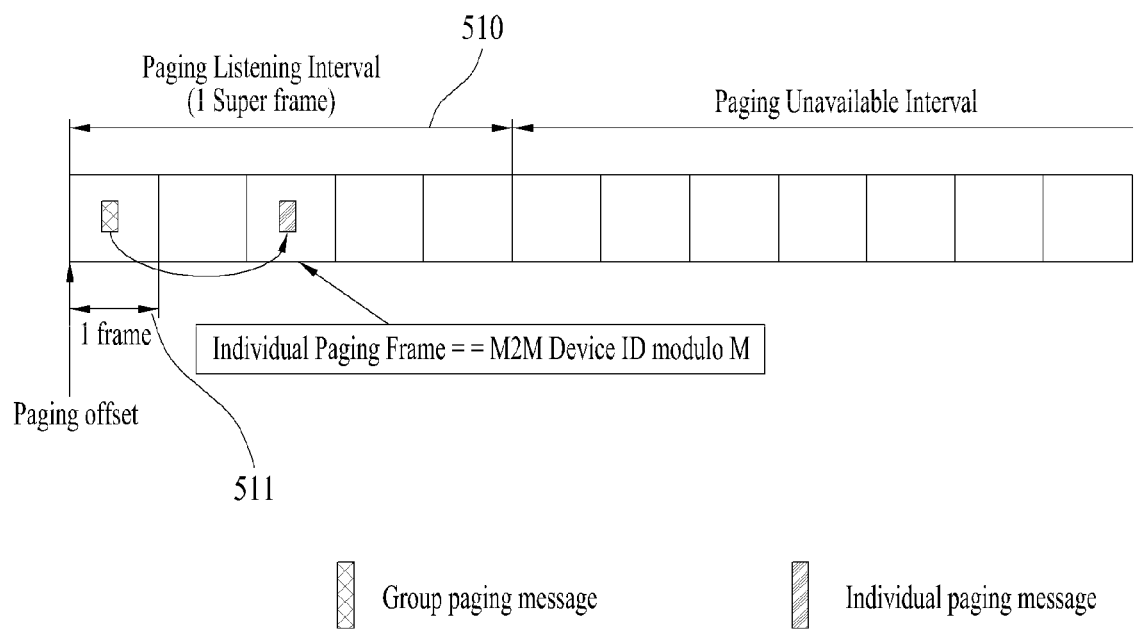
FIG. 5 is a diagram showing a hierarchical paging method according to an embodiment of the present invention.

FIG. 5 is a diagram showing a hierarchical paging method according to an embodiment of the present invention.

A paging cycle includes a paging available interval (or a paging listening interval) and a paging unavailable interval. The paging listening interval may be fixed to one superframe and the paging unavailable interval may correspond to the remaining interval excluding the paging available interval of the paging cycle.

Referring to FIG. 5, a BS may transmit an M2M group paging message (which may also be referred to as a group paging message) in a first subframe of a first frame of a listening interval (paging available interval) 510 of an M2M device. A processor 120 of the M2M device may decode and confirm a received group paging message and perform an action requested by the BS. In the present invention, it is possible to indicate an individual paging message transmitted to an M2M device via a group paging message.

As shown in FIG. 5, a processor 170 of a BS may confirm a group paging message and determine a frame via which an individual paging message is transmitted using a predefined equation if the individual paging message is transmitted. At this time, the predetermined equation is exemplary and an index of the individual paging frame may be determined by operation of an M2M device ID modulo m. Here, m may be delivered to the M2M device in an M2M group paging message.

Table 2 shows an example of an M2M group paging (e.g., AAI-M2M-GRP) message proposed by the present invention.

TABLE 2

| Field | Size (bits) | Value/Description | Condition |
|---|---|---|---|
| M2M Group paging message format { Num__M2M Group for (i=0; i< Num__M2M Group; i++) { | 4 | | |
| M2M Group Paging ID (MGPID) | TBD | Used to indicate M2M Group Paging ID for the M2M Group to be paged. | |
| m | 2 | Time domain hash parameter (1~4) used to determine the frame index of a superframe for M2M Individual Paging Message transmission of an idle mode M2M device. | Shall be present when the Bit #0, 2, 3 in Action Bitmap are set to 1 and Action type is set to 1. |

TABLE 2-continued

| Field | Size (bits) | Value/Description | Condition |
|---|---|---|---|
| Action Bitmap | 4 | Bit #0: Perform the network reentryBit #1: Receives the multicast trafficBit #2: Perform ranging for location updateBit #3: Updates control parameters | |
| if (Bit #0 in Action Bitmap == 0) { | | | |
| Individual paging indication | 1 | It indicates the individual paging message. M2M device monitors the M2M Individual Paging Message based on M2M Device ID mod m. | Presented if it needed. |
| } if (Bit #0 in Action Bitmap == 1) { | | | |
| Action Type | 1 | 0: It indicates the group network reentry. All M2M devices belong to M2M Group shall perform the network reentry. 1: It indicates the individual paging message. M2M device monitors the M2M Individual Paging Message based on M2M Device ID mod m. | |
| } if (Bit #2 in Action Bitmap == 1) { | | | |
| Action Type | 1 | 0: It indicates the group location update. All M2M devices belong to M2M Group shall perform the location update. 1: It indicates the individual paging message. M2M device monitors the M2M Individual Paging Message based on M2M Device ID mod m. | |
| } if (Bit #3 in Action Bitmap == 1) { | | | |
| Action Type | 1 | 0: It indicates the group parameter update. All M2M devices belong to M2M Group shall update the control parameters. 1: It indicates the individual paging message. M2M device monitors the M2M Individual Paging Message based on M2M Device ID mod m. | |
| If (Action type == 0) { | | | |
| Paging Unavailable Interval | TBD | Paging Unavailable Interval to the M2M device | Presented if it needs to be updated. |
| Paging Cycle | TBD | Paging cycle applied to the M2M device | Presented if it needs to be updated. |
| M2M Group Paging ID (MGPID) | TBD | Used to indicate M2M Group Paging ID for the M2M Group to be paged. | Presented if it needs to be updated. |
| UL forbidden time | TBD | Time duration to prohibit M2M devices from ranging request for re-entry or location update for SMS within paging unavailable interval(s). | Presented if it needs to be updated. |
| Start offset | TBD | This field is start offset of UL forbidden time from the end of paging listening interval(s). | Presented if it needs to be updated. |

TABLE 2-continued

| Field | Size (bits) | Value/Description | Condition |
|---|---|---|---|
| } | | | |
| } //End of If (Bit #3 in Action Bitmap == 1) | | | |
| } //End of for (i=0; i< Num_M2M Group; i++) | | | |
| }//End of M2M Group Paging Message format | | | |

Referring to Table 2, the M2M group paging (e.g., AAI-M2M-GRP) message may be used to enter a network, receive multicast traffic, perform ranging for location update, and update a control parameter.

In an action bitmap field, bit #0 (a bit of an index 0) is related to network reentry. If bit #0 is set to 1, the M2M device performs network reentry and, if bit #0 is set to 0, the M2M device does not perform network reentry. If bit #0 is set to 0, the processor 120 of the M2M device may monitor an (M2M) individual paging message based on an operation of the M2M device ID modulo m of the predetermined equation.

In addition, in the action bitmap field, bit #1 is related to reception of multicast traffic. A BS may deliver multicast traffic to M2M devices belonging to an M2M group (identified by an M2M group paging ID) via a group paging message. In this case, bit #1 may be set to 1.

In addition, in the action bitmap field, bit #2 is related to ranging for location update. A BS may instruct or request all M2M devices belonging to an M2M group to perform group location update by setting bit #2 to 1 in the action bitmap field through a group paging message. Then, all M2M devices belonging to the M2M group must perform location update. A fleet management service (FMS) may be one scenario to which group location update applies.

At this time, a BS may update an idle mode parameter via group location update with respect to M2M devices belonging to an M2M group. If the BS instructs or requests all M2M devices belonging to the M2M group to perform location update by setting bit #2 to 1 in the action bitmap proposed by Table 1, all M2M devices belonging to the M2M group may transmit a message (e.g., a ranging request message (AAI-RNG-REQ message) including location update information to a BS and the BS which receives the message may transmit a message (e.g., a ranging response message (AAI-RNG-RSP message) including an updated idle mode parameter to the M2M devices.

In the action bitmap field, bit #3 is related to control parameter update. A BS may request M2M devices belonging to an M2M group (identified by an M2M group paging ID or an M2M group ID) to update control parameters by setting bit #3 to 1 via a group paging message. In this case, since the group paging message is used to page several groups, message encryption is impossible. Accordingly, parameter update via the message is used to update parameters unnecessary for encryption. Parameters necessary for encryption is updated via an individual paging message. That is, an M2M device receives an individual paging message via a group paging message and updates parameters via the individual paging message. A method of instructing reception of the individual paging message will now be described.

The BS may request an M2M device to receive an individual paging message by setting bit #0 (network reentry) of an action bitmap via a group paging message and setting an action type to 1. Then, the processor 120 of the M2M device may monitor an individual paging message based on a result of an operation of an M2M device ID modulo m as an example of a predetermined equation.

The BS may request an M2M device to receive an individual paging message by setting bit #0 (network reentry) of an action bitmap of a group paging message to 0 and including an individual paging indication.

In addition, the BS may request an M2M device to receive an individual paging message by setting bit #2 (ranging for location update) of an action bitmap to 1 via a group paging message and setting an action type to 1. Then, the processor 120 of the M2M device may monitor an individual paging message based on a result of an operation of an M2M device ID modulo m as an example of a predetermined equation.

In addition, the BS may request an M2M device to receive an individual paging message by setting bit #3 (control parameter update) of an action bitmap to 1 via a group paging message and setting an action type to 1. Then, the processor 120 of the M2M device may monitor an individual paging message based on a result of an operation of an M2M device ID modulo m as an example of a predetermined equation.

The BS may request multiple actions via a group paging message. For example, the BS may request an M2M device to receive multicast traffic and, at the same time, request location update. In this case, bit #1 and bit #2 of a group paging message may be set to 1. That is, multiple actions may be requested via one paging message.

In another embodiment, if an M2M device must receive only downlink multicast traffic, a network reentry procedure is unnecessary. At this time, if a paging message is transmitted by setting bit #0 of an action bitmap to 0 and setting bit #1 to 1, the M2M device may receive multicast traffic without network reentry.

The BS may include an M2M group paging ID (MGPID) when an M2M group paging message is transmitted. The M2M group paging ID (or the M2M group ID) is allocated by a paging controller upon network entry.

Table 3 shows another example of an M2M individual paging message proposed by the present invention. The M2M individual paging message according to Table 3 is used to perform network reentry and ranging for location update and to update control parameters. The BS may request individual M2M devices to update control parameters via an individual paging message. Parameters necessary for encryption are updated via an individual paging message.

TABLE 3

| Field | Size (bits) | Value/Description | Condition |
|---|---|---|---|
| M2M Individual Paging Message format { | | | |
| M2M Group Paging ID (MGPID) | TBD | Used to indicate M2M Group Paging ID for the M2M Group to be paged. | |
| Num_M2M devices for (i=0; i < Num_M2M devices; i++) { | | | |
| M2M Device ID (MDID) | TBD | Used to indicateM2M Device ID for the M2M device to be paged | |
| Action code | 2 | 0b00: Perform the network reentry 0b01: Performs ranging for location update 0b10: update control parameters 0b11: Reserved | |
| If (Action code == 0b10) { | | | |
| Paging Unavailable Interval | TBD | Paging Unavailable Interval to the M2M device | Presented if it needs to be updated. |
| Paging Cycle | TBD | Paging cycle applied to the M2M device | Presented if it needs to be updated. |
| M2M Group Paging ID (MGPID) | TBD | Used to indicate M2M Group Paging ID for the M2M Group to be paged. | Presented if it needs to be updated. |
| UL forbidden time | TBD | Time duration to prohibit M2M devices from ranging request for re-entry or location update for SMS within paging unavailable interval(s). | Presented if it needs to be updated. |
| Start offset | TBD | This field is start offset of UL forbidden time from the end of paging listening interval(s). | Presented if it needs to be updated. |
| Group security Key | TBD | Group security key allocated per M2M Group. This key is used to encrypt an individual mac control message. An individual paging message is encrypted using this key and is transmitted. | |
| } } } | | | |

Referring to Table 3, the format of an individual paging message may include an M2M group paging ID field, a number-of-M2M-devices field (Num_M2M devices), an M2M device ID field and an action code field. If the action code field is set to 0b10 to indicate control parameter update, a paging unavailable interval field, a paging cycle field, an M2M group paging ID field, an uplink forbidden time, a start offset field, and a group security key field may be further included.

Table 4 shows an example of the format of a deregistration response message.

TABLE 4

| Field | Size (bits) | Value/Description | Condition |
|---|---|---|---|
| If (Action code == 0x07) { | | | |
| Paging offset | 12 | Used to indicate Paging offset for the AMS. Determines the superframe within the paging cycle from which the paging listening interval starts. Shall be smaller than Paging cycle value. orUsed to indicate paging offset of M2M Group Paging Message for M2M device. Determines the superframe within paging cycle from which | |

TABLE 4-continued

| Field | Size (bits) | Value/Description | Condition |
|---|---|---|---|
| | | the paging listening interval start. Shall be smaller than Paging cycle value. | |

A paging offset field indicates a paging offset for an MS and may be used to determine a superframe within a paging cycle from which a listening interval starts. Alternatively, the paging offset field indicates a paging offset of an M2M group paging message for an M2M device and may be used to determine a superframe within a paging cycle from which a paging listening interval starts.

In the present invention, an M2M group paging message and an individual paging message are not newly defined and a paging message of the existing IEEE 802.16m system may be reused to perform hierarchical paging. In addition, parameters (or fields) of Table 2 and Table 3 may be included in a paging message (e.g., an AAI-PAG-ADV message).

Table 5 shows an example of a paging message (e.g., an AAI-PAG-ADV message) proposed in order to support hierarchical paging.

TABLE 5

| Field | Size (bits) | Value/Description | Condition |
|---|---|---|---|
| Paging_Group_IDs bitmap | L | Indicate that the paging information for the corresponding paging group is included in AAI-PAG-ADV message The length of Paging_Group_IDs bitmap is same as Num_PGIDs in PGID-Info message. 0: the paging information for the corresponding PGID is not included 1: the paging information for the corresponding PGID is included | L equals the Num_PGIDs in PGID-Info message |
| For (i=0; i<M; i++) { | | | M equals the number of bits in Paging_Group_IDs bitmap whose bit is set to 1. |
| For (j=0; j<Num_AMSs; j++) { | | Num_AMSs indicates the number of paged AMSs in a corresponding paging group 1 . . . 32 | |
| Deregistration Identifier | 18 | Used to indicate Deregistration ID for the MS to be paged | Present if the Network Configuration bit == 0b0 |
| Mac Address Hash | 24 | used to identify the AMS to be paged | Present if the Network Configuration bit == 0b01 |
| Paging cycle | 4 | Used to indicate Paging cycle for the AMS to be paged 0x00: 4 superframes 0x01: 8 superframes 0x02: 16 superframes 0x03: 32 superframes 0x04: 64 superframes 0x05: 128 superframes 0x06: 256 superframes 0x07: 512 superframes 0x08-0x15: reserved | Present if the S-SFH Network Configuration bit == 0b0 |
| Action code | 1 | Used to indicate the purpose of the AAI-PAG-ADV message 0b0: perform network reentry 0b1: perform ranging for location update | |
| } } for (i=0; i< Num_M2M Group; i++) { | | | |
| M2M Group Paging ID (MGPID) | TBD | Used to indicate M2M Group Paging ID for the M2M Group to be paged. | |
| m | 2 | Time domain hash parameter (1~4) used to determine the frame index of a superframe for M2M Individual Paging Message transmission of an idle mode M2M device. | Shall be present when the Bit #0, 2, 3 in Action Bitmap are set to 1 and Action type is set to 1. |
| Action Bitmap | 4 | Bit #0: Perform the network reentry Bit #1: Receives the multicast traffic Bit #2: Perform ranging for location update Bit #3: Updates control parameters | |
| if (Bit #0 in Action Bitmap == 0) { For (i=0; i< Num_M2M device ID; i++) { | | | |
| M2M device ID | 1 | Used to indicateM2M Device ID for the M2M device to be paged | Included only when individual M2M device is paged. |
| } } if (Bit #0 in Action Bitmap == 1) { | | | |
| Action Type | 1 | 0: It indicates the group network reentry. All M2M devices belong to M2M Group shall perform the network reentry. 1: It indicates the individual M2M device is paged. | |

TABLE 5-continued

| Field | Size (bits) | Value/Description | Condition |
|---|---|---|---|
| If (Action Type == 1) {<br>For (i=0; i< Num__M2M device ID; i++) {<br>M2M device ID | 1 | Used to indicateM2M Device ID for the M2M device to be paged | Included only when individual M2M device is paged. |
| }<br>}<br>}<br>if (Bit #2 in Action Bitmap == 1) {<br>Action Type | 1 | 0: It indicates the group location update. All M2M devices belong to M2M Group shall perform the location update.<br>At this time, a BS or a network may update an idle mode parameter via group location update with respect to M2M devices belonging to an M2M group. That is, Bit #2 in Action Bitmap (Perform ranging for location update) proposed by the present invention may be set to 1 to perform location update with respect to all MSs belonging to an M2M group and a BS which receives an LU message (AAI-RNG-REQ) from an MS may transmit AAI-RNG-RSP including the updated idle mode parameter to each M2M device.<br>1: It indicates the individual M2M device is paged. | |
| If (Action Type == 1) {<br>For (i=0; i< Num__M2M device ID; i++) {<br>M2M device ID | 1 | Used to indicateM2M Device ID for the M2M device to be paged | Included only when individual M2M device is paged. |
| }<br>}<br>if (Bit #3 in Action Bitmap == 1) {<br>Action Type | 1 | 0: It indicates the group parameter update. All M2M devices belong to M2M Group shall update the control parameters.<br>1: It indicates the individual M2M device is paged. | |
| If (Action type == 0) {<br>Paging Unavailable Interval | TBD | Paging Unavailable Interval to the M2M device | Presented if it needs to be updated. |
| Paging Cycle | TBD | Paging cycle applied to the M2M device | Presented if it needs to be updated. |
| M2M Group Paging ID (MGPID) | TBD | Used to indicate M2M Group Paging ID for the M2M Group to be paged. | Presented if it needs to be updated. |
| UL forbidden time | TBD | Time duration to prohibit M2M devices from ranging request for re-entry or location update for SMS within paging unavailable interval(s). | Presented if it needs to be updated. |
| Start offset | TBD | This field is start offset of UL forbidden time from the end of paging listening interval(s). | Presented if it needs to be updated. |
| Group security key | | Group security key allocated per M2M Group. This key is used to encrypt an individual mac control message. Individual paging message is also encrypted using this key and is transmitted. | |
| }<br>If (Action Type == 1) {<br>For (i=0; i< Num__M2M device ID; i++) {<br>M2M device ID | 1 | Used to indicateM2M Device ID for the M2M device to be paged | Included only when individual M2M device is paged. |
| Paging Unavailable Interval | TBD | Paging Unavailable Interval to the M2M device | Presented if it needs to be updated. |

TABLE 5-continued

| Field | Size (bits) | Value/Description | Condition |
|---|---|---|---|
| Paging Cycle | TBD | Paging cycle applied to the M2M device | Presented if it needs to be updated. |
| M2M Group Paging ID (MGPID) | TBD | Used to indicate M2M Group Paging ID for the M2M Group to be paged. | Presented if it needs to be updated. |
| UL forbidden time | TBD | Time duration to prohibit M2M devices from ranging request for re-entry or location update for SMS within paging unavailable interval(s). | Presented if it needs to be updated. |
| Start offset | TBD | This field is start offset of UL forbidden time from the end of paging listening interval(s). | Presented if it needs to be updated. |
| Group Security key | | Group security key allocated per M2M Group. This key is used to encrypt an individual mac control message. Individual paging message is also encrypted using this key and is transmitted. | |

}
} //End of If (Bit #3 in Action Bitmap == 1)
} //End of for (i=0; i< Num_M2M Group; i++)

Referring to Table 5, a BS may instruct or request M2M devices to perform group location update by setting bit #2 of an action bitmap to 1 and setting an action type to 0, for example, via an AAI-PAG-ADV message. Then, all M2M devices belonging to a corresponding group must perform location update. In this case, a BS or a network may request M2M devices belonging to an M2M group to update an idle mode parameter via group location update. That is, the BS may request all M2M devices belonging to an M2M group to perform location update by setting bit #2 of an action bitmap to 1 in order to perform ranging for location update proposed by the present invention. Then, each M2M device may transmit a ranging request message (e.g., AAI-RNG-REQ) to the BS for location update and the BS which has received the ranging request message may transmit a ranging response message (e.g., AAI-RNG-RSP message) including the updated idle mode parameter to each M2M device.

In the present invention, a group based paging message reuses an existing AAI-PAG-ADV message format and an individual paging message is newly defined to support hierarchical paging. Table 6 shows an example of an AAI-PAG-ADV message format supporting group based paging proposed by the present invention. In this case, an individual paging message uses Table 3.

TABLE 6

| Field | Size (bits) | Value/Description | Condition |
|---|---|---|---|
| Paging_Group_IDs bitmap | L | Indicate that the paging information for the corresponding paging group is included in AAI-PAG-ADV message The length of Paging_Group_IDs bitmap is same as Num_PGIDs in PGID-Info message. 0: the paging information for the corresponding PGID is not included 1: the paging information for the corresponding PGID is included | L equals the Num_PGIDs in PGID-Info message |
| For (i=0; i<M; i++) { | | | M equals the number of bits in Paging_Group_IDs bitmap whose bit is set to 1. |
| For (j=0; j<Num_AMSs; j++) { | | Num_AMSs indicates the number of paged AMSs in a corresponding paging group 1 . . . 32 | |
| Deregistration Identifier | 18 | Used to indicate Deregistration ID for the MS to be paged | Present if the Network Configuration bit == 0b0 |
| Mac Address Hash | 24 | used to identify the AMS to be paged | Present if the Network Configuration bit == 0b01 |
| Paging cycle | 4 | Used to indicate Paging cycle for the AMS to be paged 0x00: 4 superframes 0x01: 8 superframes | Present if the S-SFH Network Configuration bit == 0b0 |

TABLE 6-continued

| Field | Size (bits) | Value/Description | Condition |
|---|---|---|---|
| | | 0x02: 16 superframes<br>0x03: 32 superframes<br>0x04: 64 superframes<br>0x05: 128 superframes<br>0x06: 256 superframes<br>0x07: 512 superframes<br>0x08-0x15: reserved | |
| Action code | 1 | Used to indicate the purpose of the AAI-PAG-ADV message<br>0b0: perform network reentry<br>0b1: perform ranging for location update | |
| }<br>}<br>for (i=0; i< Num__M2M Group; i++) {<br>M2M Group Paging ID (MGPID) | TBD | Used to indicate M2M Group Paging ID for the M2M Group to be paged. | |
| m | 2 | Time domain hash parameter (1~4) used to determine the frame index of a superframe for M2M Individual Paging Message transmission of an idle mode M2M device. | Shall be present when the Bit #0, 2, 3 in Action Bitmap are set to 1 and Action type is set to 1. |
| Action Bitmap | 4 | Bit #0: Perform the network reentry<br>Bit #1: Receives the multicast traffic<br>Bit #2: Perform ranging for location update<br>At this time, a BS or a network may update an idle mode parameter via group location update with respect to M2M devices belonging to an M2M group. That is, Bit #2 in Action Bitmap (Perform ranging for location update) proposed by the present invention may be set to 1 to perform location update with respect to all MSs belonging to the M2M group and a BS which receives an LU message (AAI-RNG-REQ) from an MS may transmit AAI-RNG-RSP including the updated idle mode parameter to each M2M device.<br>Bit #3: Updates control parameters | |
| if (Bit #3 in Action Bitmap == 1) {<br>Paging Unavailable Interval | TBD | Paging Unavailable Interval to the M2M device | Presented if it needs to be updated. |
| Paging Cycle | TBD | Paging cycle applied to the M2M device | Presented if it needs to be updated. |
| M2M Group Paging ID (MGPID) | TBD | Used to indicate M2M Group Paging ID for the M2M Group to be paged. | Presented if it needs to be updated. |
| UL forbidden time | TBD | Time duration to prohibit M2M devices from ranging request for re-entry or location update for SMS within paging unavailable interval(s). | Presented if it needs to be updated. |
| Start offset | TBD | This field is start offset of UL forbidden time from the end of paging listening interval(s). | Presented if it needs to be updated. |
| Group security key | | Group security key allocated per M2M Group. This key is used to encrypt an individual mac control message. Individual paging message is also encrypted using this key and is transmitted. | |
| }<br>} //End of If (Bit #3 in Action Bitmap == 1)<br>}//End of for (i=0; i< Num__M2M Group; i++)<br>Extension Flag | 1 | Used to indicate the remaining part of the AAI-PAG-ADV message exists<br>0b0: this is the last fragment of the AAIPAG-ADV message<br>0b1: this is not the last fragment of the AAI-PAG-ADV message; the remaining fragments of the | |

TABLE 6-continued

| Field | Size (bits) | Value/Description | Condition |
|---|---|---|---|
| | | message will be transmitted in the subsequent subframes or frames. | |
| Emergency Alert Indication | 1 | Used to indicate the presence of emergency information<br>0b0: reserved<br>0b1: there is emergency information | Optional<br>Present if there is emergency information |

Referring to Table 6, a BS may instruct or request all M2M devices belonging to an M2M group to perform location update by setting bit #2 of an action bitmap to 1 via an AAI-PAG-ADV message in order to support group based paging. Then, each M2M device may transmit a ranging request message (e.g., AAI-RNG-REQ) to the BS for location update and the BS may transmit a ranging response message (e.g., AAI-RNG-RSP message) including the updated idle mode parameter to each M2M device.

Hereinafter, multiple paging offsets for an M2M device which is operating in an idle mode will be described. Conventional operation for receiving a paging message at an idle MS (a HTC MS which is operating in an idle mode) will now be described. Upon idle mode initiation, an M2M device may be allocated multiple paging offsets by a BS via an AAI-DREG-RSP message. Multiple paging offsets include a primary paging offset and a secondary paging offset.

The processor 120 of the M2M device first monitors a primary paging offset during a paging listening interval. If the M2M device does not receive a paging message in the primary paging offset, the processor 120 of the M2M device monitors a secondary paging offset. In the present invention, idle mode paging operation performed by allocating multiple paging offset to an M2M device is proposed.

The M2M device may be allocated multiple paging offsets via an AAI-DREG-RSP message upon idle mode initiation. The primary paging offset is to receive a group paging message and the secondary paging offset is to receive an individual paging message. The primary paging offset may be received earlier than the secondary paging offset.

The M2M device may receive a group paging message from the BS in the primary paging offset of the paging listening interval. The group paging message transmitted by the BS includes an M2M group paging identifier (identified by a group to which the M2M device belongs) in an existing AAI-PAG-ADV message to page a group to which the M2M device belongs).

The M2M device may receive an individual paging message in the secondary paging offset. The individual paging message may use an M2M device-specific paging message (Table 3) for paging the M2M device, instead of the AAI-PAG-ADV message.

As another method, the M2M device may be allocated a group paging offset and an individual paging offset using an implicit method as follows.

Paging offset for receiving a group paging message=M2M group ID (group identifier) modulo m (here, m is a value transmitted at a PGID).

Paging offset for receiving an individual paging message=M2M device ID modulo m (here, m is a value transmitted at a PGID).

The M2M device may be allocated an M2M group ID and an M2M device ID by the BS via an AAI-DREG-RSP message upon idle mode initiation.

Next, the configuration of the M2M group paging ID (MG-PID) and the M2M device ID (MDID) will be described. The M2M group paging ID and the M2M device ID are unique per M2M paging group and may be allocated to the M2M device by the paging controller upon network entry or idle mode initiation.

The M2M group paging ID may be allocated by the paging controller to be managed on a group basis such that many M2M devices may receive a paging message. A plurality of M2M groups (identified by an M2M group paging ID) may be present in a paging group. The M2M group paging ID is included in a group paging message to identify an M2M group. The M2M device ID is used to identify an M2M device within the M2M group (identified by an M2M group paging ID). The M2M device ID is included in the individual paging message to identify an M2M device.

A reliable control parameter update method via a paging message will be described. As described above, in the present invention, a method of updating control parameters via a paging message is proposed. However, if control parameters are updated via a paging message, a method of enabling an M2M device to successfully receive a paging message must be provided and a BS must be aware of whether an M2M device properly updates parameters. Accordingly, in the present invention, a method of solving the above-described problems is proposed.

A method of updating control parameters via a paging message and performing error handling if a paging message is not received is proposed. The M2M device may determine whether a paging group thereof has been changed using a superframe header (SFH) and a paging group ID (PGID) information message in a paging listening interval thereof. In addition, the M2M device may receive a paging message in the paging listening interval.

The M2M device determines that the paging group has been changed if the paging group ID thereof is not detected from the PGID information message received in the paging listening interval to perform location update and is allocated new paging parameters (e.g., a paging cycle, a paging offset, a DID, etc.).

In addition, the BS may transmit a PGID information message and a paging message to the M2M device in the paging listening interval of the M2M device. If the M2M device moves to another BS and does not receive the PGID information message and the paging message during the paging listening interval, the M2M device may determine that the M2M device moves to another paging group and perform location update. During the paging listening interval of the M2M device, the PGID information may be always delivered and, although the M2M device is not paged, the paging message (the paging group ID bitmap of the M2M device is set to 0) may be delivered.

The procedure of receiving the paging message and performing location update at the M2M device will be described in association with reliable control parameter update via a paging message proposed by the present invention.

The paging controller informs a BS located in a paging group area thereof of paging parameters of idle-mode M2M devices for update. The BS may include the updated paging parameters of the idle-mode M2M devices in a paging message and broadcast the paging message to the M2M devices. The processor 120 of the M2M device may receive the paging message during the paging listening interval, apply the updated paging message, and perform idle-mode operation. The M2M device which has received the paging message may not inform the BS that the parameters have been updated. Since the paging message broadcast by the BS is delivered with a robust modulation and coding scheme (MCS) level, the M2M device may successfully receive the paging message unless a channel environment is rapidly deteriorated. Therefore, in the present invention, if the M2M device receives a paging message including updated paging parameters (or other control parameters) during the paging listening interval thereof, the M2M device does not deliver a confirmation message to the BS.

However, although the processor 120 of the M2M device checks a serving BS using a superframe header in the paging listening interval thereof, if it is determined that the PGID information message and the paging message have been received, the M2M device may request the BS to retransmit the paging message. The M2M device transmits a paging advertisement request (e.g., AAI-PAG-ADV-REQ) message when the paging listening interval is finished and waits for a response thereto.

If the M2M device does not receive the paging message, unicast MAC control messages for requesting paging message retransmission may be defined as an AAI-PAG-ADV-REQ message and an AAI-PAG-ADV-RSP message as shown in Tables 7 and 8.

TABLE 7

| Field | Size (bits) | Value/Description | Condition |
|---|---|---|---|
| AAI-PAG-ADV-REQ ( ) { } | | | |

TABLE 8

| Field | Size (bits) | Value/Description | Condition |
|---|---|---|---|
| AAI-PAG-ADV-RSP ( ) { Delivered to the M2M device by the BS via the AAI-PAG-ADV message (See Tables 2, 3, 5 and 6). } | | | |

The BS may receive ACK (a MAC control ACK extended header (MAEH) or an AAI-MSG-ACK message) from the M2M device by setting a polling bit to 1 in an MAC control extended header (MCEH) when transmitting an AAI-PAG-ADV-RSP message to the M2M device.

FIG. 6 is a diagram showing a process of requesting retransmission of a paging message if an M2M device does not receive a paging message.

Referring to FIG. 6, the M2M device receives and confirms a superframe header (SFH) in a paging listening interval thereof (S610). The M2M device may confirm a serving BS based on the SFH (S620). Thereafter, the M2M device receives and confirms a PGID information message to confirm a PGID. However, the M2M device does not receive a paging message (e.g., an AAI-PAG-ADV message) during a paging listening interval.

Thereafter, the M2M device may transmit an AAI-PAG-ADV-REQ message to the BS to request retransmission of the AAI-PAG-ADV message (S630). The BS may transmit an AAI-PAG-ADV-RSP message to the M2M device in response to the AAI-PAG-ADV-REQ message (S640). The AAI-PAG-ADV-RSP message may include a parameter included in a previously transmitted AAI-PAG-ADV message. The BS may receive an ACK signal from the M2M device by setting a polling bit of an MCEH to 1 in the AAI-PAG-ADV-RSP message. Thereafter, the M2M device may receive the AAI-PAG-ADV-RSP message, confirm that the polling bit of the MCEH is set to 1, and transmit an AAI-MSG-ACK message to the BS (S650).

FIG. 7 is a diagram showing an embodiment of confirming that an M2M device moves to another BS via a superframe header in a paging listening interval thereof and, at the same time, performing location update if a PGID information message and a paging message are not received.

The M2M device may receive and confirm a superframe header (SFH) in a paging listening interval thereof (S710). The M2M device may confirm a BS ID other than a serving BS ID based on the received SFH (S720). That is, the M2M device may confirm that the M2M moves to another BS (S720).

The M2M device may determine whether a PGID information message and a paging message have been received during a paging listening interval and determine that the M2M has moved to another paging group if the messages are not received (S730). Thereafter, the M2M device transmits an AAI-RNG-REQ message to the BS and performs location update (S740). The BS may transmit an AAI-RNG-RSP message to the M2M device in response to the AAI-RNG-REQ message transmitted by the M2M device (S750).

In the present invention, an AAI-PAG-ADV message which is not received may be requested to be retransmitted via an idle-mode location update message (AAI-RNG-REQ/RSP message).

Table 9 shows an example of an AAI-RNG-REQ message including a ranging purpose indication field.

TABLE 9

| Field | Size (bits) | Value/Description | Condition |
|---|---|---|---|
| AAI-RNG-REQ ( ) { Ranging Purpose Indication | 4 | 0b0000 = Initial network entry 0b0001 = HO reentry 0b0010 = Network reentry from idle mode 0b0011 = Idle mode location update 0b0100 = DCR mode | |

TABLE 9-continued

| Field | Size (bits) | Value/Description | Condition |
|---|---|---|---|
| | | extension0b0101 = Emergency call setup (e.g., E911)0b0110 = Location update for updating service flow management encodings of E-MBS flows0b0111 = Location update for transition to DCR mode from idle mode0b1000 = Reentry from DCR mode, coverage loss or detection of different ABS restart count. 0b1001 = Network reentry from aLegacy BS0b1010 = Zone switch to MZONEfrom LZONE0b1011 = Location update due topower down. 0b1100 = Interference mitigationrequest to a CSG Femto ABS when experiencing interference from the CSG Femto ABS0b1101 = NS/EP call setup0b1110 = Idle mode location update for requesting the AAI-PAG-ADV message 0b1111 = reserved | |
| } | | | |

That is, if it is determined that the paging message has been missed, the processor 120 of the M2M device may transmit an AAI-RNG-REQ message for requesting idle-mode location update for requesting an AAI-PAG-ADV message to the BS by setting a ranging purpose indication to, for example, 0b1110 as shown in Table 9.

Table 10 shows an example of an AAI-RNG-RSP message including a location update response field.

retransmitted by the BS in the frame or subframe indicated in the field indicating the AAI-PAG-ADV retransmission frame or subframe number included in the AAI-RNG-RSP message.

FIG. 8 is a diagram showing an embodiment of a method of requesting retransmission of an AAI-PAG-ADV message through location update.

TABLE 10

| Field | Size (bits) | Value/Description | Condition |
|---|---|---|---|
| AAI-RNG-RSP ( ) { Location Update Response | 4 | 0x0 = Success of Location Update 0x1 = Failure of Location Update 0x2 = Reserved 0x3 = Success of location update and DL traffic pending 0x4 = Allow AMS's DCR mode initiation request or DCR mode extension request 0x5 = Reject AMS's DCR mode initiation request or DCR mode extension request 0x6 = Success of location update and AAI-PAG-ADV retransmission 0x07~0xF: Reserved | Shall be included when this message is sent in response to an AAIRNG-REQ message used to perform location update or DCR mode initiation from Idle Mode or DCR mode extension or Idle mode location update for requesting the AAI-PAG-ADV message. |
| if (Location Update Response == 0x6) { AAI-PAG-ADV retransmission frame (or subframe) } } | | The BS indicates a frame or subframe number for retransmitting an AAI-PAG-ADV message to the MS. | |

If the M2M device transmits an AAI-RNG-REQ message indicating idle-mode location update for requesting an AAI-PAG-ADV message to the BS, the BS may transmit an AAI-RNG-RSP message to the M2M device by setting a location update response to 0x6 which indicates success of AAI-PAG-ADV message retransmission and location update as shown in Table 10, and retransmit an AAI-PAG-AD message. At this time, the BS may transmit information about a frame or subframe (e.g., a frame or subframe number). That is, the M2M device may receive the AAI-PAG-ADV message Referring to FIG. 8, the M2M device receives and confirms a superframe header (SFH) in a paging listening interval thereof (S810). The M2M device may confirm a serving BS based on the SFH (S820). Thereafter, the M2M device receives and confirms a PGID information message to confirm a PGID. However, the M2M device does not receive a paging message during a paging listening interval.

Thereafter, the M2M device may transmit a ranging request message (e.g., AAI-RNG-REQ message), in which a ranging purpose indication field is set to 0b1110, to the BS to request idle-mode location update for requesting the AAI-PAG-ADV message (S830). The BS may transmit an AAI-RNG-RSP message to the M2M by setting a location update response field to 0×6 in order to indicate success of AAI-PAG-ADV message retransmission request and location update (S840). Thereafter, the BS may retransmit the AAI-PAG-ADV message to the M2M device (S850).

Although the M2M device is mainly described in the above-described embodiments of the present invention, the embodiments are applicable to a general HTC terminal. In addition, in the various embodiments of the present invention, the M2M group paging ID included in the paging message format may be replaced with an M2M group ID.

According to a method of transmitting and receiving parameter update information related to an M2M device proposed by the above-described embodiments of the present invention, the M2M device may efficiently update parameters such as an M2M group ID, thereby improving communication update.

The aforementioned embodiments are achieved by combination of structural elements and features of the present invention in a predetermined manner. Each of the structural elements or features should be considered selectively unless specified separately. Each of the structural elements or features may be carried out without being combined with other structural elements or features. In addition, some structural elements and/or features may be combined with one another to constitute the embodiments of the present invention. The order of operations described in the embodiments of the present invention may be changed. Some structural elements or features of one embodiment may be included in another embodiment or replaced with corresponding structural elements or features of another embodiment. Moreover, it will be apparent that some claims referring to specific claims may be combined with other claims referring to the other claims other than the specific claims to constitute the embodiment or add new claims by means of amendment after the application is filed.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

Industrial Applicability

A method and apparatus for transmitting and receiving parameter update information in a wireless communication system is industrially available in various communication systems such as 3GPP LTE, LTE-A or IEEE 802.

The invention claimed is:

1. A method of transmitting updated idle mode parameter information for machine-to-machine (M2M) devices in an M2M group by a base station in a wireless communication system, the method comprising:
    transmitting a paging message including an identifier related to a M2M group and an indicator instructing each M2M device of the M2M group to perform a ranging for a location update or a network re-entry, the paging message further including an uplink forbidden time and a start offset of the uplink forbidden time from an end of paging listening interval;
    wherein the uplink forbidden time represents a time duration to prohibit an M2M device from transmitting a ranging request message for the location update or the network re-entry within a paging unavailable interval,
    receiving the ranging request message including a ranging purpose from each M2M device of the M2M group based upon the paging message, the ranging purpose indicating an idle mode location update; and
    transmitting a ranging response message in response to the ranging request message, the ranging response message including an indicator indicating a success of the idle mode location update and updated idle mode parameter information.

2. A method of receiving updated idle mode parameter information for machine-to-machine (M2M) devices in an M2M group by an M2M device in a wireless communication system, the method comprising:
    receiving a paging message including an identifier related to an M2M group and indicator instructing M2M devices in the M2M group to perform ranging for a location update or a network re-entry, the paging message further including an uplink forbidden time and a start offset of the uplink forbidden time from an end of paging listening interval;
    wherein the uplink forbidden time represents a time duration to prohibit an M2M device from transmitting a ranging request message for the location update or the network re-entry within a paging unavailable interval,
    transmitting the ranging request message including a ranging purpose when the M2M device belongs to the M2M group based upon the paging message, the ranging purpose indicating an idle mode location update; and
    receiving a ranging response message in response to the ranging request message, the ranging response message including an indicator indicating a success of the idle mode location update and updated idle mode parameter information.

3. The method according to claim 2, further comprising:
    updating an idle mode parameter based on the updated idle mode parameter information included in the ranging response message.

4. A base station for transmitting updated idle mode parameter information for machine-to-machine (M2M) devices in an M2M group in a wireless communication system, the base station comprising:
    a transmitter configured to transmit a paging message including an identifier related to a M2M group and indicator instructing each M2M device of the M2M group to perform a ranging for a location update or a network re-entry, the paging message further including an uplink forbidden time and a start offset of the uplink forbidden time from an end of paging listening interval;
    wherein the uplink forbidden time represents a time duration to prohibit an M2M device from transmitting a ranging request message for the location update or the network re-entry within a paging unavailable interval,
    a receiver configured to receive the ranging request message including a ranging purpose from each M2M device of the M2M group based upon the ranging request message, the ranging purpose indicating an idle mode location update; and
    wherein the transmitter is further configured to transmit a ranging response message in response to the ranging request message, the ranging response message including an indicator indicating a success of the idle mode location update and updated idle mode parameter information.

5. A machine-to-machine (M2M) device for receiving updated idle mode parameter information for M2M devices in an M2M group in a wireless communication system, the M2M device comprising:

a receiver configured to receive a paging message including an identifier related to a M2M group and indicator instructing M2M devices of the M2M group to perform a ranging for a location update or a network re-entry, the paging message further including an uplink forbidden time and a start offset of the uplink forbidden time from an end of paging listening interval;

wherein the uplink forbidden time represents a time duration to prohibit an M2M device from transmitting a ranging request message for the location update or the network re-entry within a paging unavailable interval, a transmitter configured to transmit the ranging request message including a ranging purpose based upon the paging message when the M2M device belongs to the M2M group, the ranging purpose indicating an idle mode location update; and wherein the receiver is further configured to receive a ranging response message in response to the ranging request message, the ranging response message including an indicator indicating a success of the idle mode location update and updated idle mode parameter information.

6. The method according to claim 1, wherein:

the paging message comprises AAI-PAG-ADV message, the ranging request message comprises AAI-RNG-REQ message, and the ranging response message comprises AAI-RNG-RSP message.

7. The method according to claim 2, wherein:

the paging message comprises AAI-PAG-ADV message, the ranging request message comprises AAI-RNG-REQ message, and the ranging response message comprises AAI-RNG-RSP message.

\* \* \* \* \*